United States Patent
Ambrose et al.

(10) Patent No.: US 10,378,673 B2
(45) Date of Patent: Aug. 13, 2019

(54) ACTIVE DRAIN LIQUID TRAP FOR FUEL SYSTEM

(71) Applicant: Eaton Corporation, Cleveland, OH (US)

(72) Inventors: Steven Lee Ambrose, Farmington Hills, MI (US); Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 118 days.

(21) Appl. No.: 15/465,948

(22) Filed: Mar. 22, 2017

(65) Prior Publication Data

US 2017/0227139 A1 Aug. 10, 2017

Related U.S. Application Data

(63) Continuation of application No. PCT/US2015/051938, filed on Sep. 24, 2015.
(Continued)

(51) Int. Cl.
*F16K 31/34* (2006.01)
*F02M 25/08* (2006.01)
(Continued)

(52) U.S. Cl.
CPC ........ *F16K 31/34* (2013.01); *B60K 15/03504* (2013.01); *F02M 25/0872* (2013.01);
(Continued)

(58) Field of Classification Search
CPC .... F16K 24/042; F16K 24/044; F16K 24/048; F16K 24/18; F16K 24/20; F16K 24/22;
(Continued)

(56) References Cited

U.S. PATENT DOCUMENTS 2,150,714 A * 3/1939 Davis .................... F16K 24/048
137/179
3,715,863 A * 2/1973 Zanoni ............... B01D 19/0052
96/170
(Continued)

FOREIGN PATENT DOCUMENTS

CN 101279584 A 10/2008
CN 101263023 B 6/2011
(Continued)

OTHER PUBLICATIONS

Chinese Office Action for CN Application No. 201580059458.7 dated Oct. 8, 2018, 8 pages.
(Continued)

*Primary Examiner* — Ian G Paquette
(74) *Attorney, Agent, or Firm* — RMCK Law Group PLC

(57) ABSTRACT

An active drain liquid trap configured for use with a fuel tank system and constructed in accordance to one example of the present disclosure includes a trap body, a float and a pilot. The trap body defines a first inlet, a second inlet and an outlet. The first inlet is fluidly connected to a fuel pump. The second inlet is fluidly connected to a vapor line. The float is rotatably mounted about a float pivot. The pilot moves between an open and closed position. Rotation of the float causes the pilot to be urged into an open position and fluid to be drained from the trap body through the outlet.

17 Claims, 3 Drawing Sheets

Related U.S. Application Data

(60) Provisional application No. 62/054,698, filed on Sep. 24, 2014.

(51) Int. Cl.
  *F02M 37/00* (2006.01)
  *B60K 15/035* (2006.01)
  *F16K 15/18* (2006.01)
  *B60K 15/03* (2006.01)

(52) U.S. Cl.
  CPC ....... *F02M 37/0082* (2013.01); *F16K 15/186* (2013.01); *B60K 2015/0325* (2013.01); *B60K 2015/03269* (2013.01); *B60K 2015/03289* (2013.01); *B60K 2015/03296* (2013.01); *B60K 2015/03473* (2013.01); *B60K 2015/03509* (2013.01); *F02M 2025/0863* (2013.01)

(58) Field of Classification Search
  CPC ........ F16K 24/24; F16K 24/26; F16K 24/265; F16K 24/30; F16K 24/32; F16K 24/34; F16K 24/36; F16K 24/363; F16K 24/365; F16K 15/186; B60K 15/03504; B60K 2015/03296; B60K 2015/03509; B60K 2015/03473; B60K 2015/03269; B60K 2015/03289; B60K 2015/0325; F02M 37/0082; F02M 25/0872; F02M 2025/0863
  See application file for complete search history.

(56) References Cited

U.S. PATENT DOCUMENTS

| | | | |
|---|---|---|---|
| 5,533,545 A * | 7/1996 | Robinson | F16K 31/088 137/195 |
| 2002/0157706 A1 | 10/2002 | Bergsma | |
| 2003/0074981 A1* | 4/2003 | Rebik | F16K 31/26 73/861.57 |
| 2006/0231138 A1 | 10/2006 | Devall | |
| 2008/0251523 A1 | 10/2008 | Krogull et al. | |
| 2013/0160867 A1 | 6/2013 | Nemeth | |
| 2013/0160877 A1 | 6/2013 | Walter et al. | |

FOREIGN PATENT DOCUMENTS

| | | |
|---|---|---|
| CN | 103174568 B | 6/2017 |
| EP | 0777833 B1 | 2/2000 |
| EP | 1216874 A2 | 6/2002 |
| EP | 1702785 A1 | 9/2006 |
| EP | 1967404 A1 | 9/2008 |

OTHER PUBLICATIONS

European Search Report for EP Application No. 15843567.7 dated Feb. 27, 2018, 7 pages.

International Search Report and Written Opinion for International Application No. PCT/US2015/051938 dated Jan. 6, 2016, 11 pages.

* cited by examiner

ACTIVE DRAIN LIQUID TRAP FOR FUEL SYSTEM

CROSS-REFERENCE TO RELATED APPLICATIONS

This application is a continuation of International Application No. PCT/US2015/051938 filed on Sep. 24, 2015, which claims the benefit of U.S. Patent Application No. 62/054,698 filed on Sep. 24, 2014. The disclosures of the above applications are incorporated herein by reference.

FIELD

The present disclosure relates generally to fuel tanks on passenger vehicles and more particularly to an active drain liquid trap configuration for a vehicle fuel system.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle. In addition to managing the vapor emission, some fuel systems include liquid traps. Many liquid traps are configured to operate as part of a venturi pump pressure reducer. The venturi pump typically is configured to run constantly and provides unwanted parasitic loss.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An active drain liquid trap configured for use with a fuel tank system and constructed in accordance to one example of the present disclosure includes a trap body, a float and a pilot. The trap body defines a first inlet, a second inlet and an outlet. The first inlet is fluidly connected to a fuel pump. The second inlet is fluidly connected to a vapor line. The float is rotatably mounted about a float pivot. The pilot moves between an open and closed position. Rotation of the float causes the pilot to be urged into an open position and fluid to be drained from the trap body through the outlet.

According to other features the pilot comprises an overmolded diaphragm seal. The active drain liquid trap can further comprise a plate biased against a first seat by a first biasing member. The plate has a plate seal and defines an orifice. The plate seal sealingly engages the first seat in a closed position upon equalized pressure on opposite sides of the plate. The pilot is normally biased toward a closed position by a pilot biasing member. The first end of the pilot is configured to be engaged by the float. The second end of the pilot includes a pilot seal member configured to sealingly engage a pilot seat.

According to still other features, the active liquid trap can further comprise a pressure reducer disposed in the liquid trap adjacent the outlet. The pressure reducer receives fuel flowing around the pilot seal when the pilot is in the open position. The pressure reducer reduces pressure of fuel passing therethrough. The active drain liquid trap can further comprise a check valve that is normally biased toward a check valve seat by a check valve biasing member. The check valve is urged against the bias of the check valve biasing member and away from the check valve seat upon rotation of the float allowing liquid fuel to be drained out of the outlet. The active drain liquid trap can further comprise a first magnet disposed on the pilot and a second magnet disposed on the float. The first and second magnets are arranged to repel each other. The overmolded diaphragm seal includes a diaphragm that extends from the plate seal to the trap body.

An active drain liquid trap configured for use with a fuel tank system and constructed in accordance to additional features includes a trap body, a float, a pilot and a plate. The trap body can define a first inlet, a second inlet and an outlet. The first inlet can be fluidly connected to a fuel pump. The second inlet can be fluidly connected to a vapor line. The float can be rotatably mounted about a float pivot. The pilot can move between an open and a closed position. A first portion of the pilot is configured to be engaged by the float. A second portion of the pilot can include a pilot seal member that is configured to sealingly engage a pilot seat. The plate can be biased against a first seat by a first biasing member. The plate can have a plate seal and define an orifice. The plate seal can sealingly engage a first seat in a closed position upon equalized pressure on opposite sides of the plate. Rotation of the float can cause the pilot to be urged into an open position. Fluid can be drained from the trap body through the outlet.

According to additional features, the active drain liquid trap can further comprise a check valve that is normally biased toward a check valve seat by a check valve biasing member. The check valve is urged against the bias of the check valve biasing member and away from the check valve seat upon rotation of the float allowing liquid fuel to be drained out of the outlet. A pressure reducer can be disposed in the liquid trap adjacent the outlet. The pressure reducer can receive fuel flowing around the pilot seal member when the pilot is in the open position. The pressure reducer can reduce the pressure of the fuel passing therethrough.

An active drain liquid trap configured for use with a fuel tank system can include a trap body, a solenoid, a float and a reed switch trigger. The trap body can define a first inlet, a second inlet and an outlet. The first inlet is fluidly connected to a fuel pump. The second inlet is fluidly connected to a vapor line. The solenoid can have an actuator that moves between a first closed position and a second open position. The float can be disposed in the trap body and be movable between a first position corresponding to a first amount of fuel in the trap body and a second position corresponding to a second amount of fuel in the trap body. The second amount being greater than the first amount. The reed switch trigger can be configured to communicate a signal to the solenoid based on a position of the float. Movement of the float from the first position to the second position causes the reed switch trigger to communicate a signal to the solenoid wherein the actuator moves from the closed position to the open position resulting in fluid to be drained from the trap body through the outlet.

According to other features, the active drain liquid trap can further include a plate biased against a first seat by a first biasing member. The plate has a plate seal and defines an orifice. The plate seal can sealingly engage the first seat in a closed position upon equalized pressure on opposite sides of the plate. A diaphragm can extend from the plate seal to the trap body. A check valve can be normally biased toward a check valve seat by a check valve biasing member. The check valve is urged against the bias of the check valve biasing member and away from the check valve seat upon rotation of the float allowing liquid fuel to be drained out of the outlet.

According to still other features, the active drain liquid trap can further comprise a pressure reducer that receives fuel when the actuator is in the open position. The pressure reducer reduces the pressure of the fuel passing therethrough. Once enough liquid is drained out of the outlet back into the fuel tank, the float returns to the first position. The trap body can further define a fluid passage. Fluid moves through the fluid passage when the actuator is in the open position.

BRIEF DESCRIPTION OF THE DRAWINGS

The present disclosure will become more fully understood from the detailed description and the accompanying drawings, wherein.

DETAILED DESCRIPTION

At the outset, the present teachings disclose various active drain liquid traps for fuel systems. Each active drain liquid trap (ADLT) disclosed herein discloses various mechanisms that selectively drain the ADLT when needed. Explained further, each ADLT disclosed herein are configured to operate only when needed, or when a predetermined amount of fluid occupies the ADLT, rather than continually. In this regard, the ADLT's of the present teachings provide more efficient strategies for evacuating liquid from the liquid trap while offering energy savings.

Figure 1:
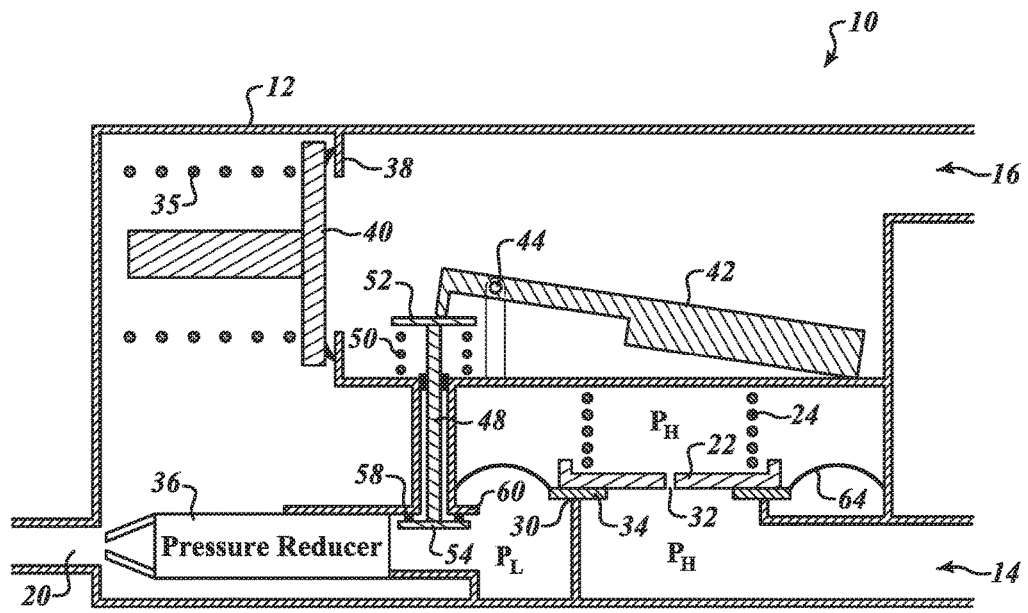
FIG. 1 is a schematic illustration of an active drain liquid trap (ADLT) having a float activated motive flow according to one example of the present disclosure and shown with no liquid in the trap.
Figure 2:
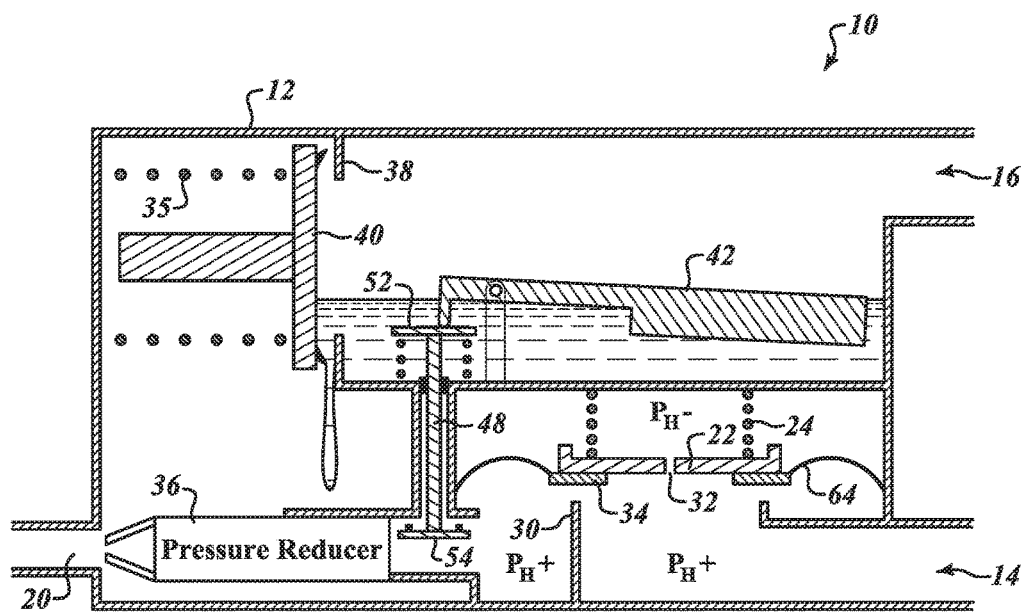
FIG. 2 is a schematic illustration of the ADLT of FIG. 1 and shown with liquid in the trap.

With initial reference to FIGS. 1 and 2, an active drain liquid trap (ADLT) having a float activated motive flow according to one example of the present disclosure is shown and generally identified at reference 10. The ADLT 10 is shown in FIG. 1 with no liquid in the trap. The ADLT 10 is shown in FIG. 2 with liquid in the trap. The ADLT 10 can generally comprise a trap body 12 that defines a first inlet 14, a second inlet 16 and an outlet 20. The first inlet 14 can be an inlet from a fuel pump (not specifically shown). The second inlet 16 can be an inlet from a vapor line. A plate 22 can be biased by a first biasing member 24 against a first seat 30. The plate 22 can define an orifice 32 and a plate seal 34. The plate seal 34 can sealingly engage the first seat 30 (FIG. 1). A pressure reducer 36 can be disposed in the ADLT 10. The pressure reducer 36 can reduce the pressure of fuel passing therethrough A check valve 40 can be biased by a check valve or second biasing member 35 against a second seat 38. A float 42 is rotatably mounted about a float pivot 44. A pilot 48 is normally biased toward a closed position (FIG. 1) by a pilot or third biasing member 50. A first end 52 of the pilot 48 is configured to be engaged by the float 42. A second end 54 of the pilot 48 includes a seal member 58 configured to sealingly engage a pilot or third seat 60. A diaphragm 64 extends from the plate seal 34 to the trap body 12.

When pressure is equalized on both sides of the plate 22, the first biasing member 24 urges the plate 22 into the closed position with the plate seal 34 sealingly urged against the first seat 30 (FIG. 1). As soon as the ADLT 10 begins to accumulate liquid within the trap body 12, the float 42 will rise (rotate counterclockwise as shown in FIGS. 1 and 2). Rotation of the float 42 will cause the float 42 to actuate the first end 52 of the pilot 48 resulting in the seal member 58 from moving away from the third seat 60. In addition, the check valve 40 will be urged against the bias of the second biasing member 35 causing the check valve 40 to move away from the second seat 38 (FIG. 2). Further, the plate 22 and the plate seal 34 will advance away from the first seat 30 allowing liquid to flow between the plate seal 34 and the first seat 30. Once enough liquid is drained out of the outlet 20 back into the fuel tank, the float 42 will occupy the position shown in FIG. 1, and no energy is needed.

Figure 3:
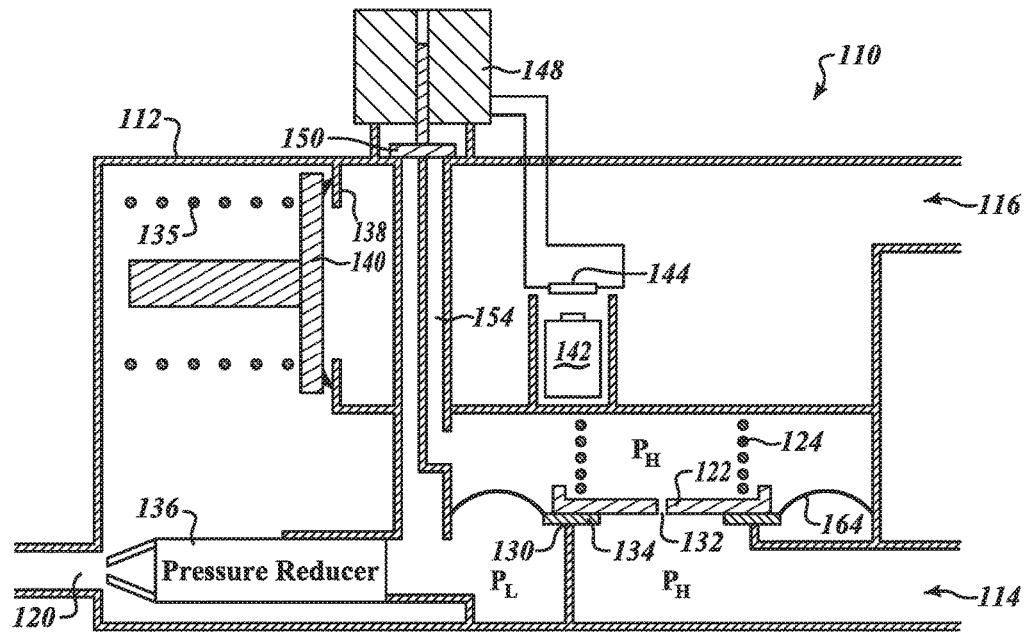
FIG. 3 is a schematic illustration of an ADLT having a solenoid activated motive flow according to another example of the present disclosure and shown with no liquid in the trap.
Figure 4:
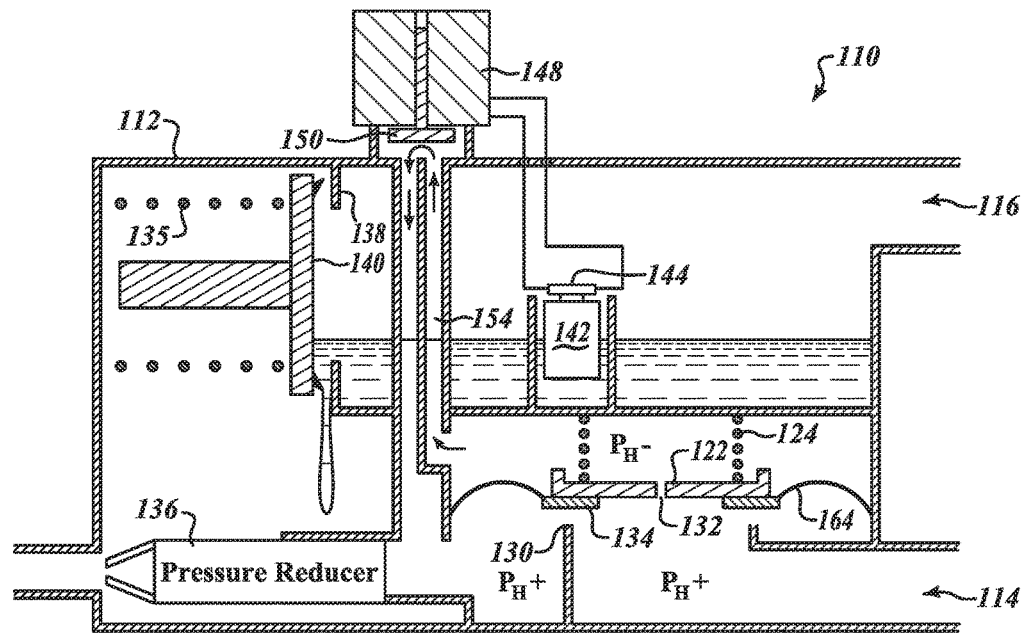
FIG. 4 is a schematic illustration of the ADLT of FIG. 3 and shown with liquid in the trap.

Turning now to FIGS. 3 and 4, an ADLT having a solenoid activated motive flow according to another example of the present disclosure is shown and generally identified at reference 110. The ADLT 110 is shown in FIG. 3 with no liquid in the trap. The ADLT 110 is shown in FIG. 4 with liquid in the trap. The ADLT 110 can generally comprise a trap body 112 that defines a first inlet 114, a second inlet 116 and an outlet 120. The first inlet 114 can be an inlet from a fuel pump (not specifically shown). The second inlet 116 can be an inlet from a vapor line. A plate 122 can be biased by a first biasing member 124 against a first seat 130. The plate 122 can define an orifice 132 and a plate seal 134. The plate seal 134 can sealingly engage the first seat 130 (FIG. 3). A pressure reducer 136 can be disposed in the ADLT 110.

A check valve 140 can be biased by a second biasing member 135 against a second seat 138. A float 142 can be arranged to move toward and away from a reed switch trigger 144 based on the fluid in the trap body 112. The reed switch trigger 144 can communicate a signal to a solenoid 148 based on the level of the fluid in the trap body 112. The solenoid 148 can have an actuator 150 that moves between a first position (FIG. 3) and a second position (FIG. 4). When the actuator 150 occupies the position shown in FIG. 3, a fluid passage 154 is blocked. When the actuator 150 occupies the position shown in FIG. 4, the fluid passage 154 is opened.

A diaphragm 164 extends from the plate seal 134 to the trap body 112. When pressure is equalized on both sides of the plate 122, the first biasing member 124 urges the plate 122 into the closed position with the plate seal 134 sealingly urged against the first seat 130 (FIG. 3). As soon as the ADLT 110 begins to accumulate liquid within the trap body 112, the float 142 will rise toward the reed switch trigger 144. When the reed switch trigger 144 reaches a predetermined location (FIG. 4), the reed switch trigger 144 sends a signal to the solenoid 148 and the actuator 150 moves from the first position (FIG. 3) to the second position (FIG. 4). In the second position, fluid moves through the fluid passage 154. In addition, the check valve 140 will be urged against the bias of the second biasing member 135 causing the check valve 140 to move away from the second seat 138 (FIG. 4). Further, the plate 122 and the plate seal 134 will advance away from the first seat 130 allowing liquid to flow between the plate seal 134 and the first seat 130. Once enough liquid is drained out of the outlet 120 back into the fuel tank, the float 142 will return to the position shown in FIG. 3.

Figure 5:
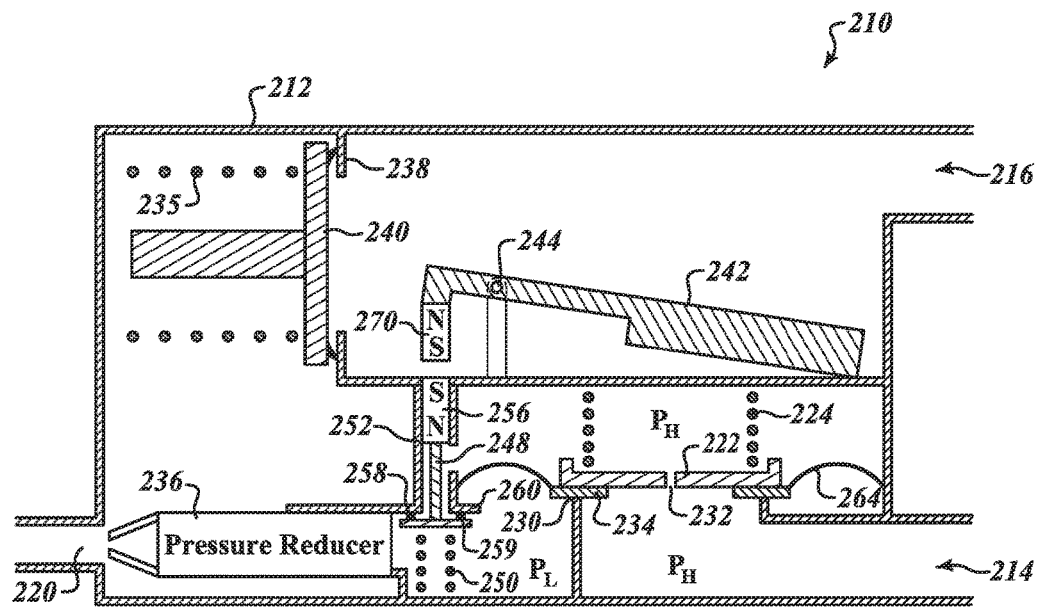
FIG. 5 is a schematic illustration of an ADLT having a float activated motive flow using permanent magnets for zero leak pilot valve according to another example of the present disclosure and shown with no liquid in the trap.

Turning now to FIG. 5, an ADLT having a float activated motive flow according to another example of the present disclosure is shown and generally identified at reference 210. The ADLT 210 is shown in FIG. 5 with no liquid in the trap. The ADLT 210 can generally comprise a trap body 212 that defines a first inlet 214, a second inlet 216 and an outlet 220. The first inlet 214 can be an inlet from a fuel pump (not specifically shown). The second inlet 216 can be an inlet from a vapor line. A plate 222 can be biased by a first biasing member 224 against a first seat 230. The plate 222 can define an orifice 232 and a plate seal 234. The plate seal 234 can sealingly engage the first seat 230. A pressure reducer 236 can be disposed in the ADLT 210.

A check valve 240 can be biased by a check valve biasing member 235 against a second seat 238. A float 242 is rotatably mounted about a float pivot 244. A pilot 248 is normally biased toward a closed position (FIG. 5) by a pilot biasing member 250. A first end 252 of the pilot 248 includes a first magnet 256. A second end 258 of the pilot 248 includes a seal member 259 configured to sealingly engage a third seat 260. A diaphragm 264 extends from the plate seal 234 to the trap body 212.

The float 242 includes a second magnet 270 disposed thereon. The second magnet 270 is arranged to repel the first magnet 256. Explained further, the polarities are arranged such that common polarities oppose each other. In the example shown, "S" polarities oppose each other.

When pressure is equalized on both sides of the plate 222, the first biasing member 224 urges the plate 222 into the closed position with the plate seal 234 sealingly urged against the first seat 230. As soon as the ADLT 210 begins to accumulate liquid within the trap body 212, the float 242 will rise (rotate counterclockwise in FIG. 5). Rotation of the float 242 will cause the second magnet 270 to move toward the first magnet 256 are repel the first magnet 256 away. When the first magnet 256 moves away (downward as viewed in FIG. 5), the seal member 259 will move away from the seat 260 allowing fluid to move therebetween. In addition, the check valve 240 will be urged against the bias of the second biasing member 235 causing the check valve 240 to move away from the second seat 238 (see position of check valve 40, FIG. 2). Further, the plate 222 and the plate seal 234 will advance away from the first seat 230 allowing liquid to flow between the plate seal 234 and the first seat 230 (see position of plate 22, FIG. 2). Once enough liquid is drained out of the outlet 220 back into the fuel tank, the float 242 will return to the position shown in FIG. 5.

Figure 6:
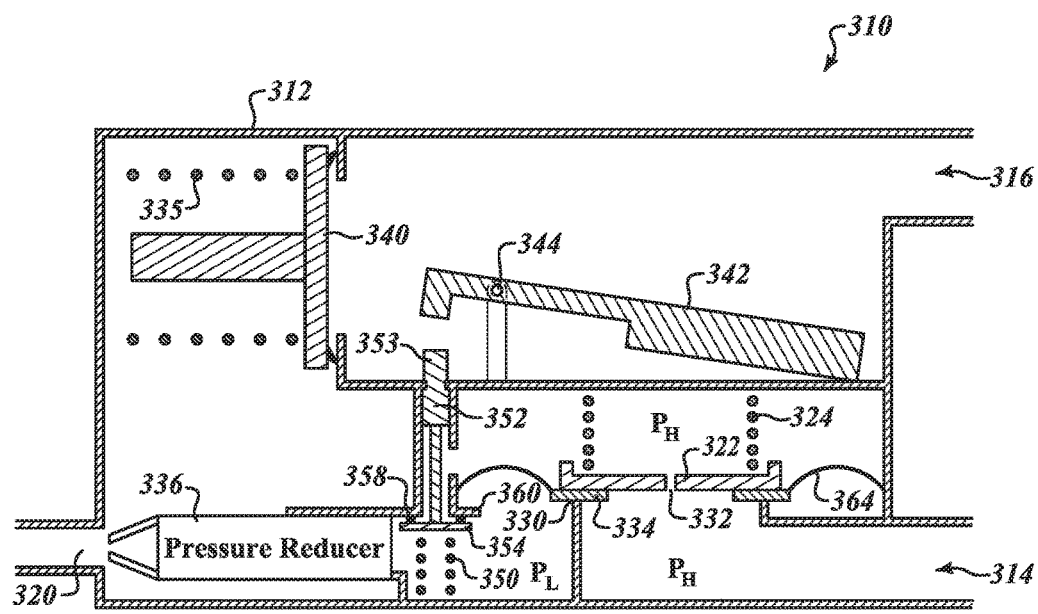
FIG. 6 is a schematic illustration of an ADLT having a float activated motive flow using a diaphragm type seal for zero leak pilot valve according to another example of the present disclosure and shown with no liquid in the trap.

With reference now to FIG. 6, an active drain liquid trap (ADLT) having a float activated motive flow according to one example of the present disclosure is shown and generally identified at reference 310. The ADLT 310 is shown in FIG. 6 with no liquid in the trap. The ADLT 310 can generally comprise a trap body 312 that defines a first inlet 314, a second inlet 316 and an outlet 320. The first inlet 314 can be an inlet from a fuel pump (not specifically shown). The second inlet 316 can be an inlet from a vapor line. A plate 322 can be biased by a first biasing member 324 against a first seat 330. The plate 322 can define an orifice 332 and a plate seal 334. The plate seal 334 can sealingly engage the first seat 330 (FIG. 1). A pressure reducer 336 can be disposed in the ADLT 310.

A check valve 340 can be biased by a second biasing member 335 against a second seat 338. A float 342 is rotatably mounted about a float pivot 344. A pilot 348 is normally biased toward a closed position (FIG. 6) by a third biasing member 350. A first end 352 of the pilot 348 is configured to be engaged by the float 342. The first end 352 is in the form of an overmolded diaphragm seal 353. A second end 354 of the pilot 348 includes a seal member 358 configured to sealingly engage a third seat 360. A diaphragm 364 extends from the plate seal 334 to the trap body 312.

When pressure is equalized on both sides of the plate 322, the first biasing member 324 urges the plate 322 into the closed position with the plate seal 334 sealingly urged against the first seat 330 (FIG. 6). As soon as the ADLT 310 begins to accumulate liquid within the trap body 312, the float 342 will rise (rotate counterclockwise as shown in FIG. 6). Rotation of the float 342 will cause the float 342 to actuate the first end 352 of the pilot 348 resulting in the seal member 358 from moving away from the third seat 360. In addition, the check valve 340 will be urged against the bias of the second biasing member 335 causing the check valve 340 to move away from the second seat 338 (see FIG. 2). Further, the plate 322 and the plate seal 334 will advance away from the first seat 330 allowing liquid to flow between the plate seal 334 and the first seat 330 (as shown in FIG. 2). Once enough liquid is drained out of the outlet 320 back into the fuel tank, the float 342 will occupy the position shown in FIG. 6, and no energy is needed.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An active drain liquid trap configured for use with a fuel tank system, the active drain liquid trap comprising:
   a trap body that defines a first inlet, a second inlet and an outlet, the first inlet fluidly connected to a fuel pump, the second inlet fluidly connected to a vapor line;
   a float rotatably mounted about a float pivot;
   a pilot that moves between an open and closed position;
   a plate biased against a first seat by a first biasing member, the plate having a plate seal and defining an orifice, the plate seal sealingly engaging the first seat in a closed position upon equalized pressure on opposite sides of the plate; and
   wherein rotation of the float causes the pilot to be urged into an open position and fluid to be drained from the trap body through the outlet.

2. The active drain liquid trap of claim 1 wherein the pilot comprises an overmolded diaphragm seal.

3. The active drain liquid trap of claim 1, further comprising a check valve that is normally biased toward a check valve seat by a check valve biasing member and wherein the check valve is urged against the bias of the check valve biasing member and away from the check valve seat upon rotation of the float allowing liquid fuel to be drained out the outlet.

4. The active drain liquid trap of claim 1, further comprising a first magnet disposed on the pilot and a second magnet disposed on the float, wherein the first and second magnets are arranged to repel each other.

5. The active drain liquid trap of claim 1 wherein the overmolded diaphragm seal includes a diaphragm that extends from the plate seal to the trap body.

6. The active drain liquid trap of claim 1 wherein the pilot is normally biased toward a closed position by a pilot biasing member.

7. The active drain liquid trap of claim 6 wherein a first end of the pilot is configured to be engaged by the float and a second end of the pilot includes a pilot seal member configured to sealingly engage a pilot seat.

8. The active drain liquid trap of claim 7, further comprising a pressure reducer disposed in the liquid trap adjacent the outlet, the pressure reducer receiving fuel flowing around the pilot seal when the pilot is in the open position, the pressure reducer reducing pressure of fuel passing therethrough.

9. An active drain liquid trap configured for use with a fuel tank system, the active drain liquid trap comprising:
   a trap body that defines a first inlet, a second inlet and an outlet, the first inlet fluidly connected to a fuel pump, the second inlet fluidly connected to a vapor line;
   a float rotatably mounted about a float pivot;
   a pilot that moves between an open and closed position, wherein a first portion of the pilot is configured to be engaged by the float and a second portion of the pilot includes a pilot seal member configured to sealingly engage a pilot seat;
   a plate biased against a first seat by a first biasing member, the plate having a plate seal and defining an orifice, the plate seal sealingly engaging the first seat in a closed position upon equalized pressure on opposite sides of the plate; and
   wherein rotation of the float causes the pilot to be urged into an open position and fluid to be drained from the trap body through the outlet.

10. The active drain liquid trap of claim 9, further comprising a check valve that is normally biased toward a check valve seat by a check valve biasing member and wherein the check valve is urged against the bias of the check valve biasing member and away from the check valve seat upon rotation of the float allowing liquid fuel to be drained out the outlet.

11. The active drain liquid trap of claim 9, further comprising a pressure reducer disposed in the liquid trap adjacent the outlet, the pressure reducer receiving fuel flowing around the pilot seal member when the pilot is in the open position, the pressure reducer reducing pressure of fuel passing therethrough.

12. An active drain liquid trap configured for use with a fuel tank system, the active drain liquid trap comprising:
   a trap body that defines a first inlet, a second inlet and an outlet, the first inlet fluidly connected to a fuel pump, the second inlet fluidly connected to a vapor line;
   a float rotatably mounted about a float pivot;
   a pilot that moves between an open and closed position;
   a check valve that is normally biased toward a check valve seat by a check valve biasing member and wherein the check valve is urged against the bias of the check valve biasing member and away from the check valve seat upon rotation of the float allowing liquid fuel to be drained out the outlet; and
   wherein rotation of the float causes the pilot to be urged into an open position and fluid to be drained from the trap body through the outlet.

13. The active drain liquid trap of claim 12 wherein the pilot comprises an overmolded diaphragm seal.

14. The active drain liquid trap of claim 13 wherein the overmolded diaphragm seal includes a diaphragm that extends from the plate seal to the trap body.

15. The active drain liquid trap of claim 12 wherein the pilot is normally biased toward a closed position by a pilot biasing member.

16. The active drain liquid trap of claim 15 wherein a first end of the pilot is configured to be engaged by the float and a second end of the pilot includes a pilot seal member configured to sealingly engage a pilot seat.

17. The active drain liquid trap of claim 16, further comprising a pressure reducer disposed in the liquid trap adjacent the outlet, the pressure reducer receiving fuel flowing around the pilot seal when the pilot is in the open position, the pressure reducer reducing pressure of fuel passing therethrough.

* * * * *